2,699,435

POLYUREA RESINS

Robert W. Auten, Jenkintown, and Robert S. Yost, Oreland, Pa., assignors to Rohm & Haas Company, Philadelphia, Pa., a corporation of Delaware No Drawing. Application July 22, 1952,
Serial No. 300,362

10 Claims. (Cl. 260—69)

This invention deals with polyhydroxypolyurea-formaldehyde condensates and with methods for their preparation.

These condensates are prepared by steps wherein an alkylene polyamine is condensed with an epihalohydrin to a soluble polyhydroxypolyalkylenepolyamine hydrohalide, the polyhydroxypolyalkylenepolyamine is then reacted with urea, whereby a polyhydroxypolyurea is formed, and said polyhydroxypolyurea is reacted with formaldehyde to form stable soluble methylol derivatives or polyurea resins.

Alkylene polyamines have been reacted with an excess of epichlorohydrin to form insoluble products suitable for use as anion-exchange resins. In the primary stage of the process of this invention, however, alkylene polyamines and epichlorohydrin or the equivalent epihalohydrin are reacted in such proportions that soluble reaction products result. These products are then further reacted in a series of procedural steps to give finally soluble methylol condensates which are useful for imparting wet strength to paper.

For the preparation of the initial condensates there may be used any alkylene polyamine or mixture of alkylene polyamines having alkylene chains of two to three carbon atoms. Typical of these are ethylenediamine, propylenediamine, trimethylenediamine, diethylenetriamine, dipropylenetriamine, triethylenetetramine, N,N'-di(aminoethyl)ethylenediamine, tetraethylenepentamine, pentaethylenehexamine, or the like. These polyamines may be represented by the formula $NH_2(C_nH_{2n}NH)_xH$, where $n$ has a value of two to three and $x$ is an integer from one upwards, being usually not over 12.

One or more of these polyamines is reacted with epichlorohydrin or epibromohydrin at a temperature between about 0° C. and 100° C. Reaction may be carried out by mixing the two reactants in proper proportion and heating the mixture. Mixing and heating are best accomplished in the presence of an inert volatile solvent, such as water or a short chained saturated monohydric aliphatic alcohol. The presence of solvent is desirable to moderate the reaction and ensure soluble reaction products.

But more important in this regard is the ratio of alkylene polyamine to epihalohydrin. There should be used at least one mole of epihalohydrin per mole of polyamine up to about 1.4 moles of epihalohydrin per mole of polyamine, the proportions in any case being selected to yield soluble reaction products under the particular conditions of reaction, particularly with respect to solvent, concentration, temperature, time, and the like. The optimum ratios vary somewhat with the particular polyamine. For example, with ethylenediamine the optimum ratios are 1.0:1 to 1.2:1, with diethylenetriamine 1.1:1 to 1.3:1, with triethylenetetramine 1.2:1 to 1.4:1, and with tetraethylenepentamine 1.0:1 to 1.25:1.

The reaction between alkylene polyamine and epihalohydrin is continued until complex polyhydroxypolyalkylenepolyamine compounds are formed in molecular sizes sufficient to impart some degree of viscosity to solutions thereof.

For purposes of this invention the reaction is carried on until an aqueous solution containing about 46% of polyamine reaction product solids has a viscosity from J to $Z_7$ on the Gardner-Holdt scale at 25° C. Preferably the reaction products at 46% polyamine solids in water impart a viscosity to the solution from T to $Z_4$ on the Gardner-Holdt scale.

This product is formed in the reaction mixture as a hydrohalide. It is best to react the hydrohalide with a base to take up the hydrogen halide and liberate the free polyhydroxypolyalkylenepolyamine. For this purpose there may be used sodium or potassium hydroxide or sodium or potassium carbonate or bicarbonate or combinations of these materials. The sodium or potassium halide which results may be left in the reaction mixture. If desired, free polyhydroxypolyalkylenepolyamine and alkali metal halide may be separated by extracting the former with a volatile aliphatic alcohol, such as methanol, ethanol, or isopropanol.

The polyhydroxypolyalkylenepolyamine is now reacted with urea. This may be done by driving off solvent from the said polyamine and fusing it with urea. Alternatively a concentrated solution of said polyamine is heated with urea, pressure being used if necessary to effect the desired reaction. Ammonia is liberated and is taken off. Absorption of the ammonia provides a convenient way to follow the reaction.

Temperatures for reaction of a said polyamine and urea lie between 100° and 200° C. The evolution of ammonia begins between 100° and 110° C. and continues slowly at this level. Raising the temperature considerably accelerates the reaction. A temperature range from 110° to 160° C. is preferred.

There should be used in general about one mole of urea per reactive —NH— group of the polyhydroxypolyalkylenepolyamine. Somewhat less than one mole of urea may, however, be used with —NH— groups remaining in the product, but a marked deficiency of urea allows side reactions to occur. Excess urea does no harm, remaining for the most part in the reaction mixture. It is thus desirable to use from 0.5 to 1.8 moles of urea per —NH— group of said polyamine.

The desired type of product at this stage is obtained when the reaction mixture in aqueous solution with 45% polyurea solids has a viscosity from B to $Z_3$ at 25° C. on the Gardner-Holdt scale, and preferably from F to Z.

When polyureas meeting this requirement have been formed, they may be used as coreactants with urea and formaldehyde or melamine and formaldehyde or the like. They may also be reacted with formaldehyde to form useful methylol derivatives and it is with these that this invention is particularly concerned.

The proportions of formaldehyde reacted with the above polyureas may be varied over a wide range. Usually there may be used from one half to three moles of formaldehyde per ureido group or per —NH— group in the polyurea. It is preferred that one to two moles be used per ureido group or —NH— group, as this gives the most stable, soluble methylol products.

For the reaction of the polyureas formed as described above with formaldehyde reaction temperatures from about 20° to 100° C. may be used. The reaction is conveniently carried out in aqueous solution at a pH between 7 and 9.5, aqueous formaldehyde solutions containing 30% to 50% of formaldehyde then being used. The formaldehyde may also be supplied at least in part from alcoholic solutions or from paraformaldehyde.

The resulting complex polymethylol products may be used in the solutions in which they are formed or these solutions may be concentrated or dried at low pressure. The reaction products may also be mixed with urea-formaldehyde condensates or melamineformaldehyde condensates.

Preparation of typical condensates is illustrated by the following examples.

Example 1

(a) A reaction vessel equipped with stirrer, thermometer, reflux condenser, and dropping funnel was charged with 292 parts by weight of triethylenetetramine and 392 parts by weight of water. The vessel was cooled to about 15° C. and kept below 20° C. while 254 parts by weight of epichlorohydrin were slowly added. When addition of epichlorohydrin was completed, cooling of the reaction vessel was discontinued. The temperature of the reaction mixture slowly rose to 60° C. The mixture was then stirred and heated on a steam bath for four hours. The resulting product was a solution of polyhydroxypolyalkylenepolyamine hydrochloride. The solution had a Gardner-Holdt viscosity of about $Z_3$.

There were mixed 150 parts by weight of this solution and 34.8 parts by weight of aqueous 50% sodium hydroxide solution. To the resulting solution urea was added in an amount of 146.4 parts. The mixture was warmed under reduced pressure while 27 parts of water were stripped off. The mixture was then heated under reflux. Ammonia was evolved and was absorbed in an amount of 35 parts. There was obtained a solution of polyhydroxypolyalkylenepolyurea containing 78.1% of total solids. The viscosity of a solution adjusted to 50% solids was E+ on the Gardner-Holdt scale.

(b) There were mixed 50 parts by weight of the above polyurea, 105 parts of aqueous 37% formaldehyde solution, and 50 parts of water. The mixture was stirred until a clear solution was obtained. It contained 29.5% of resin solids and 1.8% of sodium chloride and had a Gardner-Holdt viscosity of A—. The product was the methylol derivative of the above polyhydroxypolyalkylenepolyurea.

This product was used in the preparation of paper sheets. It imparted very high wet strength thereto.

*Example 2*

(a) The procedure of Example 1(a) was followed, 292 parts of triethylenetetramine, 309 parts of water, and 185 parts of epichlorohydrin being mixed with cooling. The reaction mixture was heated at 90°–95° C. for three hours. The resulting solution of polyhydroxypolyalkylenepolyamine hydrochloride had a polyamine content of 51.2% and a viscosity of Q+ on the Gardner-Holdt scale at 25° C.

A portion of 300 parts of this solution was treated with 61 parts of aqueous 50% sodium hydroxide solution and then with 91.5 parts of urea. This provided a ratio of 0.5 mole of urea per —NH— group. Water was taken off under reduced pressure and the mixture was then heated at 100° to 120° C. with evolution of ammonia. There was thus formed a concentrated (69%) solution of polyhydroxypolyalkylenepolyurea. A 43% aqueous solution thereof had a viscosity of C at 25° C. on the Gardner-Holdt scale.

(b) There were mixed 50 parts of the above concentrated solution of polyurea, 90 parts of aqueous 37% formaldehyde solution, and 50 parts of water. The mixture was stirred at 30°–40° C. for two hours. There was thus formed a solution containing 30.1% of resin solids and having a viscosity of $A_1$ at 25° C. This solution was stored for three months at 45° C. It then had a viscosity of P—. It was effective for improving the wet strength of various types of paper.

*Example 3*

(a) In the same way as in Example 2(a) there were reacted together epichlorohydrin and triethylenetetramine but in a mole ratio of 1.38:1 to give a solution containing 47.6% of polyhydroxypolyalkylenepolyamine and having a viscosity of $Z_4$ on the Gardner-Holdt scale. This polyamine was reacted as above with urea in a ratio of 0.5 mole of urea per —NH— group, refluxing with evolution of ammonia being carried on for one half hour. The resulting solution contained 65.3% of polyurea. Diluted to a concentration of 41.5% of polyurea this polyurea imparted thereto a Gardner-Holdt viscosity of Y+ at 25° C.

(b) Some of the above polyurea concentrate was diluted with water and treated with 37% formaldehyde solution, 9.5 parts thereof being mixed with 42.6 parts of water and 33 parts of 37% formaldehyde solution. The reaction mixture was stirred for two hours at 30°–35° C. There thus resulted a solution containing 11.3% of resin solids and having a Gardner-Holdt viscosity of $A_1$. After storage for 73 days at 72° F. the viscosity of this solution was $A_2$. It was effective for imparting wet strength to various types of paper.

*Example 4*

(a) By the procedure described above there were reacted together epichlorohydrin and tetraethylenepentamine in a mole ratio of 1:1. A solution of the resulting polyamine hydrochloride at 50.8% of polyamine had a viscosity of U at 25° C. The hydrochloride was destroyed with an alkaline solution and the polyamine was reacted for three hours under reflux with urea in a ratio of 1:1 for urea per —NH— group. A 45% solution of the polyhydroxypolyalkylenepolyurea in water had a Gardner-Holdt viscosity of B. The product as obtained contained 15.2% of water, 8.5% of sodium chloride, and 76.3% of polyurea.

(b) There were mixed 30 parts of the polyurea, as obtained in part (a) above and 60.6 parts of 37% formaldehyde solution. The mixture was stirred at 30° to 50° C. for a half hour. There was thus obtained a solution containing 41.7% of the methylol derivative of the polyurea. This solution had a Gardner-Holdt viscosity of E. It was quite an effective agent for imparting wet strength to paper.

*Example 5*

(a) The above procedure was repeated with a mixture of epibromohydrin and tetraethylenepentamine in a 1.2:1 mole ratio. The solution of polyhydroxypolyalkylenepolyamine formed contained 50% of polyamine and had a viscosity of V—. The intermediate product was treated with a caustic soda solution to free the polyamine and treated at 115° C. with urea in a ratio of 1:1 (moles of urea per —NH— group). A 44.3% solution of the resulting polyurea in water had a viscosity of F at 25° C. The product as obtained contained 84% of total solids, the polyurea content being 70%.

(b) There were mixed 50 parts of this product and 125 parts of aqueous 37% formaldehyde solution. The mixture was stirred at 30°–35° C. for an hour. There was thereby formed a solution containing 34.3% of the methylol-polyurea condensate. It had a Gardner-Holdt viscosity of B at 25° C. and was highly effective in imparting wet strength to paper.

*Example 6*

(a) The above procedure was repeated with epichlorohydrin and tetraethylenepentamine in a 1.25:1 mole ratio. The solution of polyamine hydrochloride at a 51.3% polyamine content had a viscosity of $Z_4$ at 25° C. This solution was treated with caustic soda solution to react with the hydrochloride and then reacted with urea in a ratio of one mole of urea per —NH— group. There was formed a solution having a total solids content of 78.8% and a polyurea content of 70.3%. A solution containing 44.3% of the polyurea had a viscosity of W— at 25° C.

(b) There were mixed 25 parts of the above polyurea concentrate, 25 parts of water, and 75 parts of aqueous 37% formaldehyde solution. The mixture was stirred and heated at 40° C. until clear. The resulting solution contained 25% of the methylol derivative of the polyurea and had a Gardner-Holdt viscosity of B+. It was highly effect for improving the wet strength of paper.

*Example 7*

(a) In the same way epichlorohydrin and diethylenetriamine in a mole ratio of 1.33:1 were reacted at temperatures up to about 100° C. The resulting polyhydroxypolyalkylenepolyamine hydrochloride in a solution containing 52.8% of the polyamine imparted thereto a Gardner-Holdt viscosity of $Z_3+$. The hydrochloride was treated with caustic soda solution to form sodium chloride and free polyamine, which was then reacted with urea in a ratio of one mole of urea per —NH— group. There was thus prepared a solution containing 78.9% of total solids, 60% being polyhydroxypolyalkylenepolyurea and 18.9% being sodium chloride. A solution diluted to 37.8% of the polyurea had a viscosity of I+ at 25° C.

(b) There were mixed 50 parts of the above product, 27 parts of water, and 107 parts of aqueous 37% formaldehyde solution. The mixture was stirred for several hours while the methylol derivative formed. The resulting solution contained 29.8% of resin solids and had a viscosity of A on the Gardner-Holdt scale. It imparted a high degree of wet strength to paper.

*Example 8*

(a) As above, there were reacted at 20° to 100° C. epichlorohydrin and ethylenediamine in a 1.18:1 mole ratio. The solution containing 54.3% of the resulting polyhydroxypolyalkylenepolyamine as the hydrochloride had a viscosity of $Z_7$ at 25° C. After reaction of the hydrochloride with caustic soda solution the polyamine was reacted with urea in a 1:1 ratio (one mole of urea per —NH— group). There resulted a solution containing 62% of polyurea and 19% of sodium chloride. A 38.3% solution of this polyurea had a viscosity of M— at 25° C.

(b) There were mixed 50 parts of the product above, 40 parts of water, and 87 parts of 37% formaldehyde solution. The mixture was stirred and warmed to about 50° C. to give the methylol derivative in solution. This solution with 28.6% of resin solids had a viscosity of C— at 25° C. After storage for about three weeks the solution had a viscosity of C. It was a very effective wet strength agent.

In the same way other alkylene polyamines having alkylene groups of two to three carbon atoms and epihalohydrins are reacted to give polyhydroxypolyalkylenepolyamines, which are reacted with urea to give polyureas, which in turn are reacted with formaldehyde to give methylol-polyurea condensates. These are soluble in water and the solutions thereof are stable for a long period of time. In the presence of acids the solutions can be caused to form gels.

We claim:

1. A process for preparing polyhydroxypolyalkylenepolyurea-formaldehyde condensates which comprises reacting between about 0° and 100° C. in the presence of water epichlorohydrin and an alkylene polyamine having two to three carbon atoms in the alkylene portion thereof in a mole ratio from 1:1 to 1.4:1 until an aqueous solution of the resulting polyhydroxypolyalkylenepolyamine at a concentration of about 46% has a viscosity from J to $Z_7$ at 25° C. on the Gardner-Holdt scale, reacting said polyhydroxypolyalkylenepolyamine with urea between 100° and 200° C. in a ratio from 0.5:1 to 1.8:1 of urea per —NH— group of said polyhydroxypolyalkylenepolyamine until an aqueous 45% solution of the resulting polyhydroxypolyalkylenepolyurea has a viscosity from B to $Z_3$ at 25° C. on the Gardner-Holdt scale, and reacting said polyhydroxypolyalkylenepolyurea with formaldehyde in a solution at a pH between 7 and 9.5.

2. A process for preparing polyhydroxypolyalkylenepolyurea-formaldehyde condensates which comprises reacting between about 0° and 100° C. in the presence of an inert volatile solvent epichlorohydrin and an alkylene polyamine having two to three carbon atoms in the alkylene portion thereof in a mole ratio of 1:1 to 1.4:1 yielding soluble reaction products, continuing this reaction until an aqueous solution of the resulting polyhydroxypolyalkylenepolyamine hydrochloride at a polyamine concentration of about 46% has a viscosity of J to $Z_7$ at 25° C. on the Gardner-Holdt scale, neutralizing the hydrochloride portion thereof, reacting the polyhydroxypolyalkylenepolyamine with urea between 100° and 200° C. with evolution of ammonia, the ratio of moles of urea per —NH— group of said polyhydroxypolyalkylenepolyamine being from 0.5:1 to 1.8:1, continuing this reaction until an aqueous 45% solution of the resulting polyhydroxypolyalkylenepolyurea has a Gardner-Holdt viscosity at 25° C. of B to $Z_3$, and reacting said polyhydroxypolyalkylenepolyurea with 0.5 to 3 moles of formaldehyde per —NH— group of said polyhydroxypolyalkylenepolyurea.

3. A process for preparing polyhydroxypolyalkylenepolyureas, which comprises reacting between about 0° and 100° C. in the presence of water epichlorohydrin and a polyethylenepolyamine in a mole ratio from 1:1 to 1.4:1 yielding soluble polyhydroxypolyalkylenepolyamines, continuing this reaction until an aqueous solution of the resulting polyhydroxypolyalkylenepolyamine hydrochloride at a polyamine content of about 46% has a viscosity from T to $Z_4$ at 25° C. on the Gardner-Holdt scale, neutralizing the hydrochloride portion thereof, reacting the polyhydroxypolyalkylenepolyamine with urea between 100° and 200° C. with evolution of ammonia until an aqueous solution containing about 45% of the resulting polyhydroxypolyalkylenepolyurea has a Gardner-Holdt viscosity at 25° C. of F to Z, the ratio of urea to —NH— group of said polyhydroxypolyalkylenepolyamine in the reaction mixture being between 0.5:1 and 1.8:1, and reacting in aqueous solution at a pH between 7 and 9.5 formaldehyde and said polyhydroxypolyalkylenepolyurea in a ratio of one to two moles of formaldehyde per —NH— group of said polyurea.

4. The process of claim 3 in which the polyethylenepolyamine is diethylenetriamine.

5. The process of claim 3 in which the polyethylenepolyamine is triethylenetetramine.

6. The process of claim 3 in which the polyethylenepolyamine is tetraethylenepentamine.

7. The product of the process of claim 3.
8. The product of the process of claim 4.
9. The product of the process of claim 5.
10. The product of the process of claim 6.

References Cited in the file of this patent

UNITED STATES PATENTS

| | | |
|---|---|---|
| 2,400,016 | Meyer | May 7, 1946 |
| 2,554,475 | Suen et al. | May 22, 1951 |